US009989375B2

(12) United States Patent
Menzel et al.

(10) Patent No.: US 9,989,375 B2
(45) Date of Patent: Jun. 5, 2018

(54) METHOD FOR TRANSMITTING TRAVEL ROUTE INFORMATION

(75) Inventors: Marc Menzel, Weimar (DE); Sighard Schräbler, Frankfurt (DE)

(73) Assignee: Continental Automotive GmbH, Hannover (DE)

( * ) Notice: Subject to any disclaimer, the term of this patent is extended or adjusted under 35 U.S.C. 154(b) by 0 days. days.

(21) Appl. No.: 13/577,882

(22) PCT Filed: Feb. 2, 2011

(86) PCT No.: PCT/EP2011/051440
§ 371 (c)(1),
(2), (4) Date: Oct. 8, 2012

(87) PCT Pub. No.: WO2011/098379
PCT Pub. Date: Aug. 18, 2011

(65) Prior Publication Data
US 2013/0066555 A1    Mar. 14, 2013

(30) Foreign Application Priority Data
Feb. 9, 2010  (DE) .................... 10 2010 007 261

(51) Int. Cl.
*G01C 21/36* (2006.01)
*G01C 21/20* (2006.01)

(52) U.S. Cl.
CPC ......... *G01C 21/3688* (2013.01); *G01C 21/20* (2013.01)

(58) Field of Classification Search
CPC ................................. G01C 21/3688

USPC ......................... 701/400, 526, 541
See application file for complete search history.

(56) References Cited

U.S. PATENT DOCUMENTS

| 6,070,123 | A  | * | 5/2000  | Beyer et al. .................. 701/420 |
| 6,178,378 | B1 |   | 1/2001  | Leibold |
| 6,253,150 | B1 | * | 6/2001  | Nakamura ............. G01C 21/26 180/170 |
| 6,427,115 | B1 |   | 7/2002  | Sekiyama |
| 8,442,768 | B2 | * | 5/2013  | Sasaki ........................... 701/533 |
| 2003/0100326 | A1 | * | 5/2003  | Grube et al. .................. 455/515 |
| 2004/0073361 | A1 | * | 4/2004  | Tzamaloukas et al. ...... 701/210 |
| 2004/0098194 | A1 | * | 5/2004  | Baur .................. G01C 21/3492 701/533 |
| 2005/0222764 | A1 | * | 10/2005 | Uyeki et al. .................. 701/210 |
| 2007/0203641 | A1 | * | 8/2007  | Diaz et al. .................... 701/208 |
| 2009/0005070 | A1 | * | 1/2009  | Forstall et al. ............ 455/456.1 |
| 2009/0204320 | A1 | * | 8/2009  | Shaffer et al. ................ 701/202 |

(Continued)

FOREIGN PATENT DOCUMENTS

| CN | 1317422 | 10/2001 |
| CN | 1705954 | 12/2005 |

(Continued)

*Primary Examiner* — Lail A Kleinman
(74) *Attorney, Agent, or Firm* — Cozen O'Connor

(57) ABSTRACT

A method for transmitting travel route information to a person present outside of a motor vehicle, and to a system for transmitting such information. The method for transmitting travel route information to a person present outside of a motor vehicle provides that a navigation system present in the motor vehicle wirelessly transmits a data stream including the information to be transmitted directly or indirectly to a display device carried by the person. The information to be transmitted can be perceived by the person by the display device.

13 Claims, 2 Drawing Sheets

(56) References Cited

U.S. PATENT DOCUMENTS

| | | | |
|---|---|---|---|
| 2010/0057340 A1* | 3/2010 | Kravets et al. | 701/201 |
| 2010/0134242 A1* | 6/2010 | Ohta et al. | 340/5.1 |
| 2010/0223006 A1* | 9/2010 | Sasaki | 701/209 |
| 2011/0054716 A1* | 3/2011 | Ståhlin et al. | 701/1 |
| 2011/0098877 A1 | 4/2011 | Ståhlin et al. | |
| 2011/0118975 A1* | 5/2011 | Chen | 701/201 |
| 2011/0140926 A1* | 6/2011 | Schrabler et al. | 340/989 |
| 2012/0252415 A1* | 10/2012 | Menzel et al. | 455/411 |

FOREIGN PATENT DOCUMENTS

| | | | |
|---|---|---|---|
| CN | 1815142 | 8/2006 | |
| DE | 19948877 A1 * | 4/2001 | ........... G08G 1/0104 |
| DE | 100 55 000 | 5/2002 | |
| DE | 100 55 000 A1 | 5/2002 | |
| DE | 102 27 287 A1 | 1/2004 | |
| DE | 103 01 190 A1 | 8/2004 | |
| DE | 10 2007 001 734 A1 | 7/2008 | |
| DE | 10 2007 001734 | 7/2008 | |
| DE | 10 2007 044 802 A1 | 7/2009 | |
| DE | 10 2007 044802 | 7/2009 | |
| DE | 10 2008 022 700 A1 | 11/2009 | |
| DE | 10 2008 022700 | 11/2009 | |
| WO | WO 2009/074655 A1 | 6/2009 | |
| WO | WO 2009/101163 A2 | 8/2009 | |

\* cited by examiner

METHOD FOR TRANSMITTING TRAVEL ROUTE INFORMATION

CROSS REFERENCE TO RELATED APPLICATIONS

This is a U.S. national stage of application No. PCT/EP2011/051440, filed on 2 Feb. 2011. Priority is claimed on German Application No. 10 2010 007 261.3 filed 9 Feb. 2010, the content of which is incorporated here by reference.

BACKGROUND OF THE INVENTION

1. Field of the Invention

The present invention relates to a method for transmitting travel route information to a person located outside a motor vehicle and to a system for transmitting such information.

2. Description of Prior Art

Nowadays many vehicles are equipped with navigation systems. These navigation systems may either be permanently integrated in the vehicle or be made available as mobile devices that are carried in the vehicle and used when necessary. With the aid of the navigation systems it is generally possible to have travel routes calculated according to different criteria such as shortest distance or fastest route. Navigation devices therefore permit travel routes to be selected in a way that is optimized with respect to time and/or cost.

However, due to large traffic volume on routes, traffic jams are frequently formed with the result that deviations from the calculated predefined times can occur on travel routes.

Waiting in a traffic jam or driving in a high traffic volume with frequent changes of speed leads, in addition to increased physical stressing of the driver of the vehicle as a result of the raised level of attention required, to increased fuel consumption and to a higher risk of accidents, both of which are undesirable. It is therefore recommended to start journeys such that traffic jams are avoided.

For this purpose, in large areas traffic jam information is made available via different media such as radio, RDS, TMC, teletext, or the Internet. In particular, the information on the traffic situation, which is made available via radio services such as RDS or TMC, can, however, usually only be obtained by the vehicle driver once in the vehicle and the journey has started. However, acquiring information at this time means it is generally too late to avoid being caught in a traffic jam.

Furthermore, the traffic information played back via the specified media does not involve individualized traffic information items that only cover the routes used by the vehicle driver but information covering a large number of routes. The driver must search through the wealth of information for the relevant information and evaluate said information. This requires the vehicle driver to take in the corresponding information, for example by listening to a radio program, and moreover requires a high level of concentration for the driver to extract the traffic information that is relevant for his route. Moreover, there is a need for local knowledge to be able to be aware of alternative routes.

SUMMARY OF THE INVENTION

An object of one embodiment of the invention is to specify a method that makes it easier for the vehicle driver to select a time to start a journey, to be able to carry out a journey in a way that is optimized in terms of time and/or cost.

According to one embodiment of the invention, a method for transmitting travel route information to a person located outside a motor vehicle is disclosed. The method is characterized in that a navigation system located in the motor vehicle transmits a data stream, containing the information to be transmitted, in a wireless fashion directly or indirectly to a playback device carried by the person. The information to be transmitted can be perceived by the person via the playback device.

In this context, devices such as electronic vehicle keys, mobile phones, PDAs, and/or pager systems are suitable as a playback device carried by the vehicle driver.

In particular, navigation systems having an integrated traffic jam signaling function such as a TMC module can receive information about the current traffic situation and transmit it to a vehicle driver in the way described.

In this context it is advantageous if the travel route, which is to be adopted, is already stored in the navigation system so that the navigation system can evaluate and select the received traffic situation information as a function of the travel route, and then pass on this selected information to the playback device. This relieves the vehicle driver significantly in terms of the selection of information since only the information relevant to the driver is provided.

With the method according to one embodiment of the invention, it is advantageously possible to dispense with the implementation of complex program structures in the playback device such as separate navigation routines, since the calculation of a route and the reconciliation of received traffic information with the calculated route can take place in the navigation system. The playback device can therefore be made correspondingly small. A corresponding playback functionality can also be implemented in already existing mobile terminals such as, for example, a mobile phone, a pager or a PDA. This can advantageously significantly increase the benefit of these terminals.

The navigation device located in the vehicle can be programmed with a corresponding travel destination and can calculate a suitable travel route before the vehicle departs.

Furthermore, it is possible to provide that a desired departure time and/or destination arrival time are programmed into the navigation system. The navigation system can then retrieve traffic information via the media available and evaluate said information taking into account the calculated travel route discontinuously, continuously, and/or as a function of the desired departure time and/or destination arrival time. The result of this evaluation can then be sent as a data stream to the playback device at which the driver can retrieve the evaluated information.

It is also possible to provide that, when the travel destination is input, a time frame for the departure time and/or arrival time can be defined and the navigation system outputs, after evaluation of the traffic information, a message that a favorable departure time is reached, which message can then be transmitted to the driver via the playback device. Such a procedure is favorable for travel routes which are used regularly, for example a daily journey to a place of work or a corresponding journey home, since the driver is informed about suitable departure times without himself having to follow the traffic situation using the corresponding media. This permits optimized use of time, for example at the place of work.

It is likewise possible to provide that the navigation system transmits continuously or discontinuously received traffic information relating to the planned travel route to the playback device in a continuous or discontinuous fashion. It is also possible to provide that the navigation system calculates alternative travel routes and also evaluates the received traffic information with respect to these alternative travel routes. It is therefore possible to transmit a recommendation as to when which travel route is favorable to the driver via the playback device. It is also possible to provide that transmission of information about a traffic situation to the playback device includes information about the influence of the traffic situation on the course of the journey.

DETAILED DESCRIPTION OF THE PREFERRED EMBODIMENTS

Figure 1:
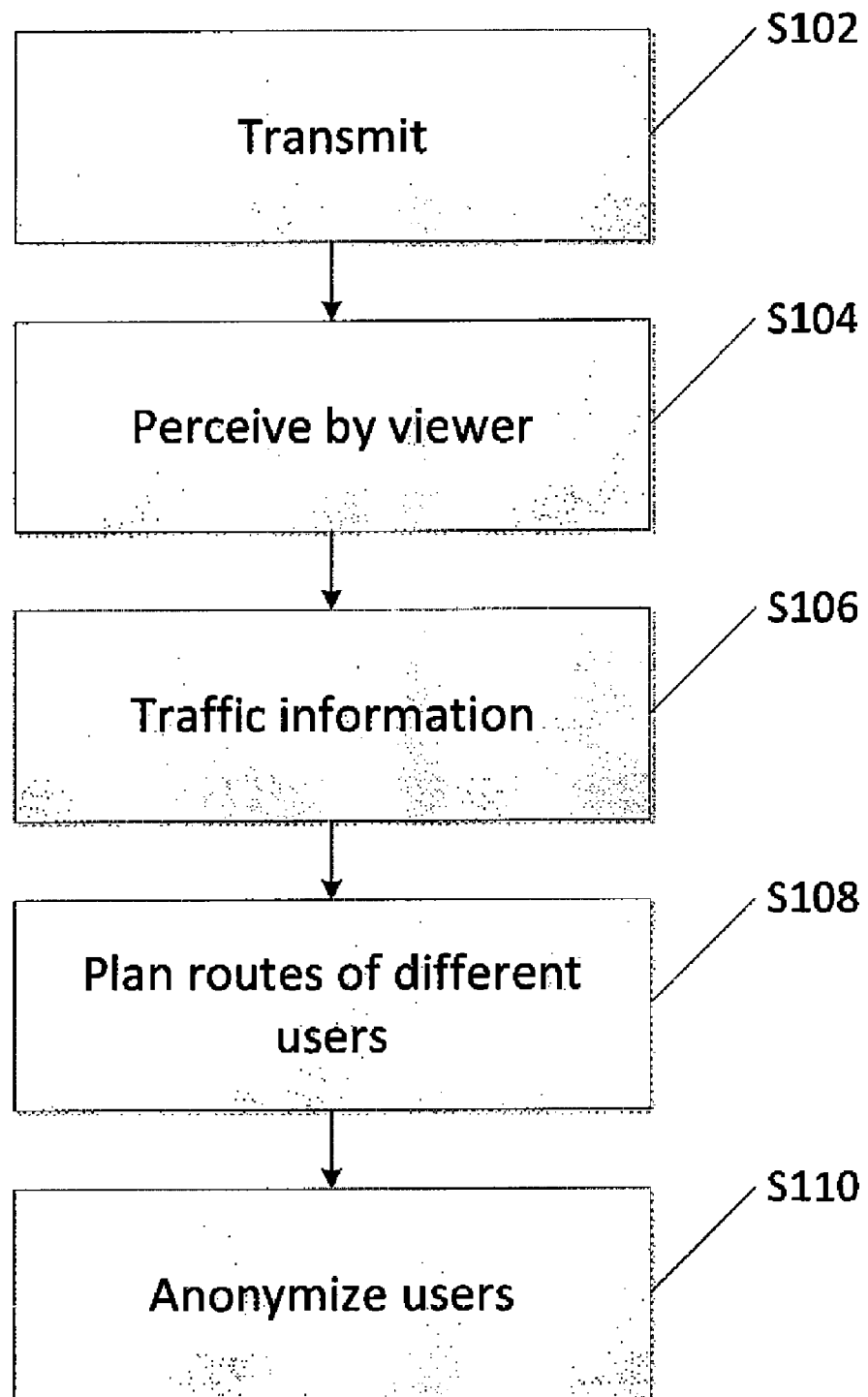
FIG. 1 is a flowchart of one embodiment of the invention.

Shown in FIG. 1, is a flowchart of method for transmitting travel route information to a person located outside a motor vehicle. A navigation system located in the motor vehicle transmits a data stream (S102) that contains the information to be transmitted. The information is transmitted in a wireless fashion directly or indirectly to a playback device, which is carried by the person. The information to be transmitted can be perceived by the person via the playback device (S104). The navigation system has a traffic jam signaling function. Information, obtained by the traffic jam signaling function about the instantaneous traffic situation on a planned travel route stored in the navigation system is transmitted (106). Travel routes of different users that are planned in the server system (S108) are collected in an anonymized fashion (S110) and evaluated in terms of the routes planned for use, and route load profiles are extrapolated from the evaluated travel routes.

Figure 2:
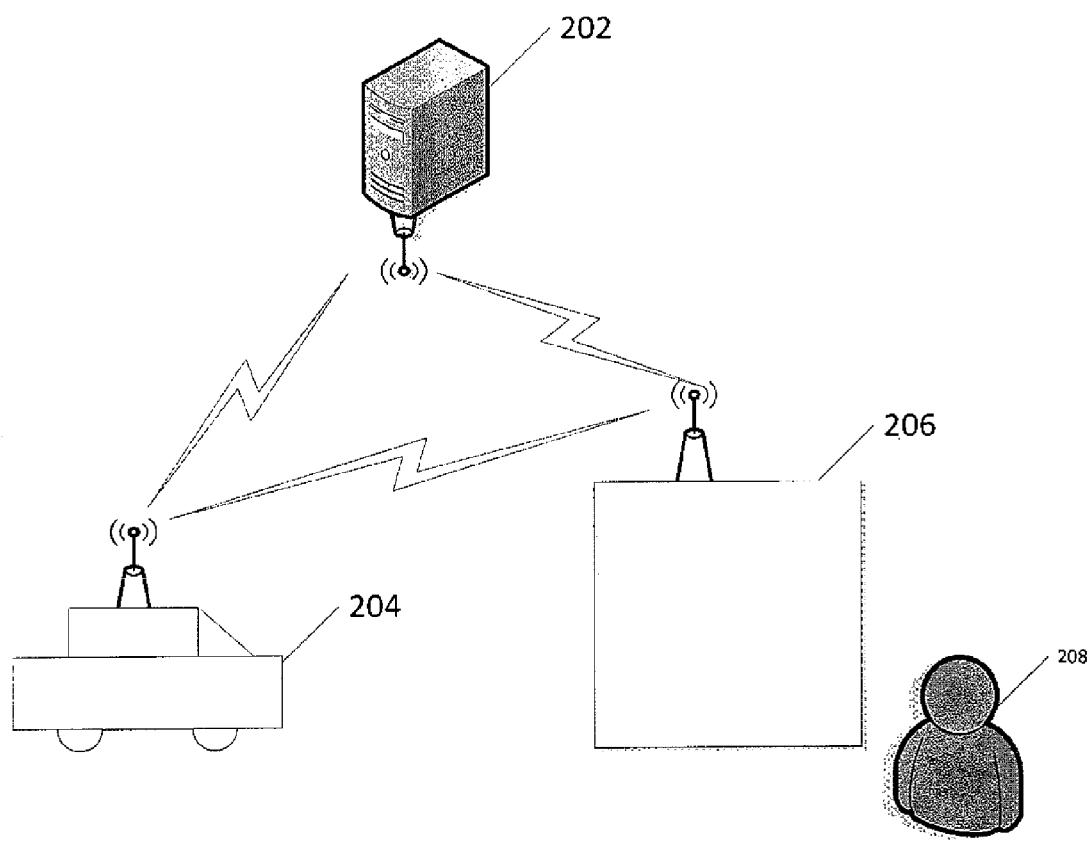
FIG. 2 is a system according to one embodiment of the invention.

FIG. 2 is a system for transmitting travel route information to a person located outside a motor vehicle, having a navigation system 204 located in the motor vehicle, a communication device for transmitting data in a wireless fashion, and a playback device 206, which can be carried by person 208. The navigation system is connected to the communication device such that a data stream that contains the travel route information to be transmitted can be sent directly or indirectly to the playback device 206 in a wireless fashion via the communication device, and the transmitted information can be perceived on the playback device 206.

In one embodiment, a server 202 compiles travel routes of different users that are planned in the server system 202. The travel routes of the different users are collected in an anonymized fashion and evaluated in terms of the routes planned for use. Route load profiles are extrapolated from the evaluated travel routes. The communication device and the playback device 206 have transmitting and/or receiving means for the wireless transmission of information by an ISM band radio link and/or a mobile radio link.

In one embodiment of the invention it is possible to provide that the system for carrying out the method is self-learning and stores frequently traveled-along routes automatically in a memory and evaluates them as a function of the traffic situation. Corresponding evaluation results can then be played back on the playback device. It is likewise possible to provide that the system is self-learning in terms of frequently occurring traffic situations and automatically takes into account traffic jam situations that occur at certain locations at rush-hour.

In one embodiment of the invention, bidirectional communication takes place between the navigation system and the playback device. This makes it possible for the driver to transmit control instructions to the navigation system via the playback device in order to react to transmitted information and/or program new travel destinations into the navigation system.

The communication between the navigation system and the playback device can take place directly or indirectly, wherein indirect communication in the sense of the invention is to be understood as meaning that said communication takes place via, for example, an intermediately connected server of a service provider. It is therefore possible to provide that the navigation system transmits a planned travel route to a server and the evaluation of the traffic situation takes place on the server. The server then transmits the result to the playback device. This makes it possible for further information to be included in the evaluation, such as information about weather conditions or the like. This further improves the quality of the transmitted information. It is also possible to provide further services such as, for example, hotel information and/or reservations, toll payment processes, etc. via the intermediately connected server so that it is possible for the driver to become aware of corresponding services via the playback device.

In a further refinement of the invention, it is possible to provide that the travel routes of different users are transmitted to a server of a service provider, anonymized and evaluated in terms of the routes planned for use. This makes it possible to extrapolate route load profiles that can then be transmitted back to the navigation devices. This makes it possible to take into account, in a route planning system, an expected route load or overload and, if appropriate, to correspondingly change the course of the route. This information can be taken into account by the user himself or in an automated fashion in the navigation system, based on criteria defined by the user.

The communication with the playback device can take place according to one embodiment of the invention via an ISM band radio link and/or a mobile radio link. By virtue of its range property, it is possible, when using an ISM band radio link, to use an 868 MHz RKE long range link capable of ensuring communication through walls of buildings.

The link can be implemented using known standards such as WLAN, Bluetooth, GSM, EDGE, HSDPA and UMTS, which permits already proven system components to be used in the method and system according to the invention.

With respect to the system, the object of one embodiment of the invention is achieved by a system for transmitting travel route information to a person located outside a motor vehicle, having a navigation system which is located in the motor vehicle, a communication device for transmitting data in a wireless fashion and a playback device, which can be carried by the person, wherein the navigation system is connected in terms of signaling technology to the communication device such that a data stream, which contains the travel route information to be transmitted, can be sent directly or indirectly to the playback device in a wireless fashion via the communication device, and the transmitted information can be perceived on the playback device.

As already stated with respect to the method according to the invention, in this context, for example, an electronic vehicle key, a mobile phone, a PDA or a pager may be provided as the playback device.

The navigation system can advantageously have a traffic jam signaling function and, in particular, information, obtained by the traffic jam signaling function, about the instantaneous traffic situation on a planned travel route stored in the navigation system can be transmitted by the system.

In a further refinement of the system according to the invention, the communication device and the playback device have transmitting and/or receiving devices for the wireless transmission of information by an ISM band radio link and/or a mobile radio link. This permits bidirectional communication, as a result of which it may be possible, for example, to transmit control instructions to the navigation system by the playback device and therefore to influence the functionalities thereof.

Thus, while there have shown and described and pointed out fundamental novel features of the invention as applied to a preferred embodiment thereof, it will be understood that various'omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting travel route information for a travel route to a person located outside a motor vehicle, comprising:
   storing the travel route comprising a route to a destination in a navigation system located in the motor vehicle;
   receiving at least one of a desired departure time and destination arrival time by the person;
   receiving traffic information by the navigation system located in the motor vehicle;
   evaluating the traffic information based at least in part on the route information as a function of the at least one of the desired departure time and the destination arrival time to determine a favorable departure time;
   selecting specific traffic information based at least in part on the evaluation of the traffic information;
   storing frequently traveled routes automatically in a memory;
   collecting and anonymizing current travel routes of different users;
   collect and anonymize planned routes of the different users;
   evaluating the current travel routes and planned routes planned for use;
   extrapolating route load profiles from the evaluated current and planned travel routes;
   determining the travel route information as a function of the received traffic information, frequently occurring traffic situations that occur at certain locations, the extrapolated route load profiles and the travel route by the navigation system located in the motor vehicle;
   transmitting data by the navigation system located in the motor vehicle via a data stream containing the travel route information, the specific traffic information, and the favorable departure time in a wireless fashion one of directly and indirectly to a separate playback device carried by the person outside the motor vehicle; and
   providing via the playback device at least the favorable departure time and the travel route information determined by the navigation system located in the motor vehicle, the travel route information configured to be perceived by the person via the playback device outside the motor vehicle.

2. The method as claimed in claim 1, wherein the playback device comprising one of an electronic vehicle key, mobile phone, PDA, and pager.

3. The method as claimed in claim 1, further comprising:
   transmitting by the navigation system a traffic jam signaling function comprising information obtained about instantaneous traffic situation on a planned travel route stored in the navigation system.

4. The method as claimed in claim 1, wherein the transmission occurs bidirectionally.

5. The method as claimed in claim 1, wherein the wireless transmission occurs via at least one of an ISM band radio link and a mobile radio link.

6. The method as claimed in claim 5, wherein the transmission of information takes place by a standard comprising one of WLAN, Bluetooth, GSM, EDGE, HSDPA, and UMTS.

7. The method as claimed in claim 1, further comprising:
   transmission of at least one of the travel route information and the received traffic information via an intermediate connection of a server system;
   wherein the server system performs the collecting and anonymizing of the current travel routes of different users planned in the server system, the evaluating the current travel routes planned for use, and the extrapolating route load profiles from the evaluated current travel routes.

8. A system for transmitting travel route information to a person located outside a motor vehicle, comprising:
   a navigation system located in the motor vehicle configured to:
   store a travel route in the navigation system located in the motor vehicle;
   receive traffic information by the navigation system located in the motor vehicle;
   receive at least one of a desired departure time and destination arrival time;
   storing frequently traveled routes automatically in a memory;
   determine the travel route information and a favorable departure time as a function of the received traffic information, frequently occurring traffic situations that occur at certain locations, and the travel route by the navigation system located in the motor vehicle; and
   select specific traffic information based at least in part on the evaluation of the traffic information;
   a communication device for transmitting data in a wireless fashion;
   a server system configured to:
   receive at least one of the travel route information and the received traffic information;
   collect and anonymize planned routes of different users planned in the server system;
   collect and anonymize current travel routes of the different users planned in the server system;
   evaluate the current travel routes and planned routes planned for use; and extrapolate route load profiles from the evaluated current and planned travel routes; and a separate playback device configured to be carried by the person outside the motor vehicle, wherein the navigation system is connected by a signaling technology to the communication device such that a data stream that contains the favorable departure time, the specific traffic data, and the travel route information to be transmitted can be sent one of directly and indirectly to the playback device in a wireless fashion via the communication device, and the transmitted information can be perceived on the playback device outside the motor vehicle, wherein the received traffic information includes the extrapolated route load profiles.

9. The system as claimed in claim 8, wherein the playback device is one of an electronic vehicle key, mobile phone, PDA and pager.

10. The system as claimed in one of claim 8, wherein the navigation system has a traffic jam signaling function and information obtained by the traffic jam signaling function related to instantaneous traffic condition on a planned travel route stored in the navigation system is transmitted by the system.

11. The system as claimed in claim 8, wherein the communication device and the playback device each have at least one of transmitting and receiving devices for the wireless transmission of information by at least one of an ISM band radio link and a mobile radio link.

12. The system as claimed in one of claim 9, wherein the navigation system has a traffic jam signaling function and information obtained by the traffic jam signaling function related to instantaneous traffic condition on a planned travel route stored in the navigation system is transmitted by the system.

13. The system as claimed in claim 12, wherein the communication device and the playback device each have at least one of transmitting and receiving devices for the wireless transmission of information by at least one of an ISM band radio link and a mobile radio link.

* * * * *